United States Patent
Mercier et al.

(10) Patent No.: US 10,512,876 B2
(45) Date of Patent: Dec. 24, 2019

(54) AIR FILTER FOR BLEED VALVE ASSEMBLY

(71) Applicant: Hamilton Sundstrand Corporation, Windsor Locks, CT (US)

(72) Inventors: James J. Mercier, Enfield, CT (US); Josh Kamp, Glastonbury, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 79 days.

(21) Appl. No.: 15/431,108

(22) Filed: Feb. 13, 2017

(65) Prior Publication Data
US 2018/0229174 A1 Aug. 16, 2018

(51) Int. Cl.
| | | |
|---|---|---|
| *B01D 39/10* | (2006.01) | |
| *B01D 39/12* | (2006.01) | |
| *B01D 39/20* | (2006.01) | |
| *B01D 46/24* | (2006.01) | |
| *F01N 3/022* | (2006.01) | |
| *F01N 3/021* | (2006.01) | |
| *F01D 25/00* | (2006.01) | |
| *F02C 9/18* | (2006.01) | |
| *B01D 46/52* | (2006.01) | |
| *F02C 6/08* | (2006.01) | |
| *B01D 46/00* | (2006.01) | |
| *F01D 17/10* | (2006.01) | |

(52) U.S. Cl.
CPC ....... *B01D 46/521* (2013.01); *B01D 46/0047* (2013.01); *B01D 46/2411* (2013.01); *F01D 17/105* (2013.01); *F02C 6/08* (2013.01); *F02C 9/18* (2013.01); *B01D 2271/027* (2013.01); *F05D 2260/607* (2013.01)

(58) Field of Classification Search
CPC ........ B01D 39/10; B01D 39/12; B01D 39/20; B01D 46/24; B01D 25/12; B01D 46/521; B01D 46/0047; B01D 46/2411; B01D 2271/02; F01N 3/022; F01N 3/021; F01D 25/00; F01D 17/105; Y10S 55/05; F02C 9/18; F02C 6/08; F05D 2260/607
USPC ................... 55/385.1, 385.3, 466, 522, 523; 123/198 E; 210/232, 416.4, 493.2, 493.5
See application file for complete search history.

(56) References Cited

U.S. PATENT DOCUMENTS

| | | | | |
|---|---|---|---|---|
| 3,807,150 | A * | 4/1974 | Maracle | B01D 46/2411 210/493.1 |
| 4,584,005 | A * | 4/1986 | Allan | B01D 46/0005 156/204 |
| 5,876,599 | A * | 3/1999 | Sylvester | B01D 29/21 210/232 |
| 6,152,978 | A * | 11/2000 | Lundquist | B01D 39/12 55/385.1 |
| 7,008,465 | B2 * | 3/2006 | Graham | A47L 9/122 210/493.5 |
| 2009/0139191 | A1 * | 6/2009 | Roundy | F02C 7/052 55/392 |
| 2014/0260982 | A1 * | 9/2014 | Williams | B01D 46/2414 95/273 |

* cited by examiner

*Primary Examiner* — Minh Chau T Pham
(74) *Attorney, Agent, or Firm* — Kinney & Lange, P.A.

(57) ABSTRACT

An air filter assembly includes an air filter element with a pleated filter and seals incorporated at either end to prevent contaminants from bypassing the filter. The air filter assembly includes a filter cover, first, second and third seals, and an air filter element with a large diameter and low micron rating.

14 Claims, 2 Drawing Sheets

AIR FILTER FOR BLEED VALVE ASSEMBLY

BACKGROUND

The present disclosure relates generally to pneumatically actuated valves and more specifically to filters for pneumatically actuated valves in bleed air systems.

Aircraft engine bleed air from the compressor stage of the engine is often re-routed within the aircraft for a number of uses, including internal cooling of the engine, cross-starting a second engine, ice protection purposes, pneumatic actuators, and many other uses. Typically, bleed air must be conditioned or directed to be used in another system. Thus, bleed air valve assemblies are used to direct and control bleed air before use elsewhere in the aircraft. Specifically, bleed valve assemblies use air filters to sift bleed air.

Typical bleed air assemblies, as found in the art, are bleed air systems with valve filters constructed of wire mesh or sintered metal screens. For pneumatic valves, the wire mesh or sintered metal screen is installed into a bore and constructed top hat style. In this configuration, the valve flange is spring loaded to seat and secure the filter element. This configuration has limited filtration capacity due to the restricted diameter of the configuration. Additionally, the micron rating of the filter is limited, as the valve would clog too quickly. Finally, this type of prior art filter lifts against the spring load when it does clog, which results in particles bypassing the filter element altogether.

SUMMARY

An air filter assembly includes a filter cover, an air filter element with a diameter ranging between 1.400 and 1.420 inches, the air filter element having an absolute micron rating of 5 microns, a first seal sealingly engaged to the filter cover and to the air filter element, a second seal sealingly engaged to the filter cover and to the air filter element, and a third seal sealingly engaged to the air filter element and a housing near an inlet flow path.

A method of filtering incoming bleed air includes receiving bleed air from an engine, routing the bleed air through an inlet path, filtering the bleed air through an air filter element with an absolute micron rating of 5 microns, and delivering the bleed air through an outlet path.

DETAILED DESCRIPTION

Improved methods of filtration for pneumatic valves are increasingly important. Filtration contaminants continually clog valves resulting in decreased life of the valve system, and increased failure rates. A valve assembly with increased capacity having a larger diameter, smaller micron rating filter element, and a better sealing system can prevent breakdowns and is more efficient than prior designs.

Figure 1:
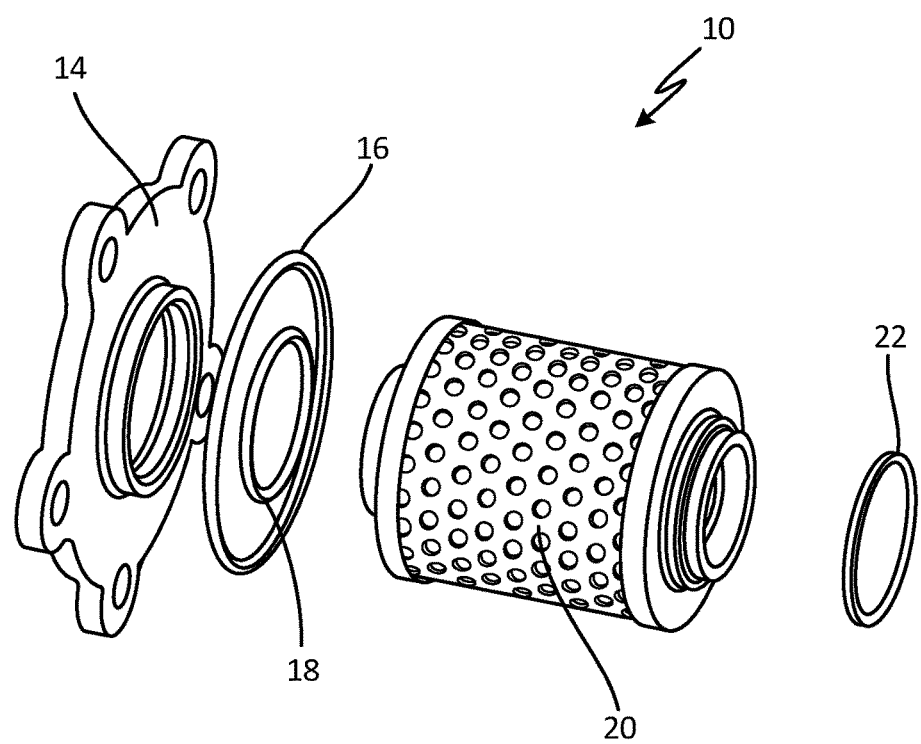
FIG. 1 is an exploded perspective view of a valve assembly.

FIG. 1 is an exploded perspective view of valve assembly 10. Assembly 10 includes filter cover 14, first seal 16, second seal 18, air filter element 20, and third seal 22. Filter cover 14 is metallic and can be made of a nickel alloy. Filter cover 14 is on an end of assembly 10, and keeps pressure inside valve assembly 10 in conjunction with housing 12 (shown in FIG. 2). Air filter assembly 10 can have a total length between about 2.025 inches and about 2.045 inches, depending on the exact needs of the system.

First and second seals 16, 18 are located between filter cover 14 and air filter element 20. First and second seals 16, 18 are C-seals, in one embodiment are made of metal and can be made of a nickel alloy, such as Inconel 718, for example. Seals 16, 18 are compressed between and seal to both the filter cover 14 and the air filter element 20 to prevent leakage of fluid. First seal 16 has a larger diameter than second seal 18. First seal 16 is configured to prevent external leakage of fluid or contaminants going through air filter element 20, while second seal 18 is configured to prevent bypass of contaminants around air filter element 20.

Air filter element 20 is linked to filter cover 14 by first and second seals 16, 18, on an outlet side of assembly 10. Opposite filter cover 14, air filter element 20 is connected to third seal 22 on an inlet side of assembly 10. Air filter element 20 can be made of a metallic alloy, such as a high-temperature cobalt or nickel based alloy with a minimum temperature capability of 1100 degrees Fahrenheit, and can have a length of about 1.645 inches, which allows for efficient filtering of contaminants. Air filter element 20 is a high capacity, pleated filter with an effective filtration area of 10 square inches minimum. The pleated nature of the filter allows greater surface area on which contaminants can stick, as compared to a flat filter found in the art. Traditional non-pleated filters only capture a certain size contaminant, while pleated filters have higher efficiency. Overall, the filter area of air filter element 20 is approximately thirty times larger than a typical air filter element used to filter bleed air. This allows filter element 20 to have a high surface area, increasing capacity of the assembly, and to maintain a long lifespan as it is used.

Additionally, air filter element 20 of assembly 10 uses a finer mesh filtration compared to the known art. A micron rating is typically used to indicate the ability of a fluid filter to remove contaminants by the size of the particles. Thus, a smaller micron rating means smaller particles can be removed when passing through a filter. Nominal micron ratings express the ability of a filter to capture particles of a specific size at an efficiency between 50% and 90%. In contrast, an absolute micron rating means the filter is capable of removing at least 98% of a particular size particle. In the art, absolute micron ratings of about 17 microns have been used in similar bleed air filter assemblies. In assembly 10, the mesh filtration has an absolute micron rating of 5. Thus, this filter catches significantly more contaminants than those in the prior art.

Air filter element 20 can have such a low absolute micron rating in part due to the diameter $D_2$ (shown in FIG. 2) of assembly 10. Assembly 10 has a larger diameter $D_2$ than other filters disclosed in the art. The diameter $D_2$ of assembly 10 as a whole is between about 1.495 and about 1.505 inches. The diameter $D_1$ of air filter element 20 is between 1.400 inches and 1.420 inches (shown in FIG. 2). Typically, prior art filters have diameters ranging from 0.225 inches to 0.710 inches. In assembly 10, if the diameter is too small, the life of assembly 10 is shortened, and air filter element 20 clogs quickly. But if the diameter is too large, outlet flow paths leading away from air filter element 20 are blocked. The length $L_1$ of air filter element 20 is between 1.480 inches and 1.500 inches, shown in FIG. 2. Air filter assembly 10 has a length $L_2$ between 2.025 inches and 2.045 inches (shown in FIG. 2).

Third seal 22 is also a metallic C-seal, located at an inlet of assembly 10. C-seals are a resilient metal seal that can be created to fit a particular diameter and system. Third seal 22 prevents contaminants from bypassing air filter element 20. Third seal 22 is connected to a valve housing 12 (shown in FIG. 2). Seals 16, 18 and 22 interface with air filter element 20 and a housing 12 to seal assembly 10. Seals 16, 18 and 22 incorporated at each end to prevent contaminants from bypassing assembly 10.

Figure 2:
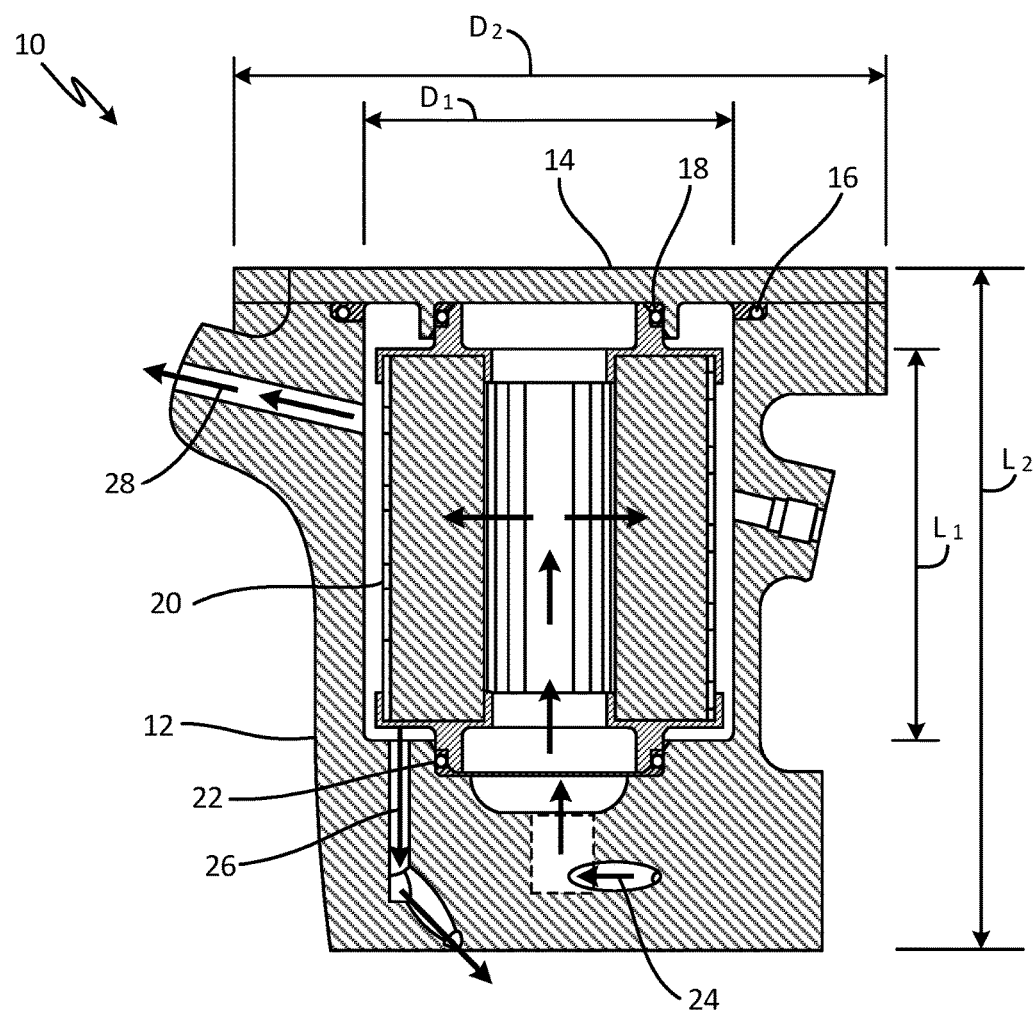
FIG. 2 is a schematic cross section view of the valve assembly in FIG. 1.

FIG. 2 is a schematic cross sectional view of the valve assembly in FIG. 1. Valve assembly 10 includes the same parts as FIG. 1, and additionally highlights fluid flow in assembly 10 by showing valve housing 12, inlet flow path 24, and first and second outlet flow paths 26, 28.

In valve assembly 10, filter cover 14, first seal 16, second seal 18, air filter element 20, and third seal 22 are surrounded by valve housing 23. Fluid enters assembly 10 through inlet flow path 24 (shown by incoming arrows). Typically, the fluid is highly contaminated bleed air from the compressor region of an engine. The fluid runs through a separator, which removes large debris (of sizes greater than 40 microns) before the fluid flows into assembly 10. Fluid flows through third seal 22 to air filter element 20, where it is filtered and contaminants are separated from the fluid. First and second outlet flow paths 26, 28 are made of circular drill paths (paths created through drill methods) designed to direct outgoing filtered fluid. Filtered outgoing fluid flows out first or second outlet flow paths 26, 28, to different locations, depending on the needs of the system.

Assembly 10 is highly efficient because of its large diameter, low micron rating filter element, and seal system which together better filter incoming bleed air and prevent leakage. There are several aspects to the design of assembly 10. First, the large diameter of the filter element allows for a high capacity of the valve system, improving the durability of the component. The filter element takes longer to clog due to the increased diameter. Second, the construction of the filter element allows for a lower micron rating, which protects downstream components and allows for longer life of the valve assembly. Finally, the valve system does not lift or allow for a flow path around the filter when the filter clogs. There is no axial plug load due to the sealing around the filter element.

The increased capacity and lifespan of the valve assembly is critical for several reasons. First, a valve assembly for use in bleed air control is a relatively expensive part, as it is a must be a brazed or welded assembly. Second, there is a high replacement cost factor; these parts are typically replaced at valve overhaul. Finally, protection of the air filter element allows for better control and life of the assembly as a whole.

Discussion of Possible Embodiments

The following are non-exclusive descriptions of possible embodiments of the present invention.

An air filter assembly includes a filter cover, an air filter element with a diameter ranging between 1.400 and 1.420 inches, the air filter element having an absolute micron rating of 5 microns, a first seal sealingly engaged to the filter cover and to the air filter element, a second seal sealingly engaged to the filter cover and to the air filter element, and a third seal sealingly engaged to the air filter element and a housing near an inlet flow path.

The assembly of the preceding paragraph can optionally include, additionally and/or alternatively, any one or more of the following features, configurations and/or additional components:

The air filter element comprises a high capacity pleated filter.

The air filter assembly has a length between 2.025 inches and 2.045 inches.

The air filter element has a length between 1.480 inches and 1.500 inches.

The air filter assembly has a diameter between 1.495 inches and 1.505 inches.

The air filter element is made of a material selected from the group consisting of nickel, cobalt or an alloy thereof.

The first, second and third seals are made of a material selected from the group consisting of nickel, cobalt or an alloy thereof.

The air filter assembly includes at least one circular drill path extending from a bleed air source to the air filter element.

The air filter assembly includes a first circular drill path extending from the air filter element to a first outlet.

The air filter includes a second circular drill path extending from the air filter element to a second outlet.

A method of filtering incoming bleed air includes receiving bleed air from an engine, routing the bleed air through an inlet path, filtering the bleed air through an air filter element with an absolute micron rating of 5 microns, and delivering the bleed air through an outlet path.

The method of the preceding paragraph can optionally include, additionally and/or alternatively, any one or more of the following features, configurations and/or additional components:

The method includes passing the bleed air through a separator with a rating of 40 microns prior to routing the bleed air through an inlet path.

The air filter element is sealed such that there is negligible leakage of bleed air out of the air filter element.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An air filter arrangement comprising:
   a filter cover;
   an air filter element with a diameter ranging between 1.400 and 1.420 inches, the air filter element having an absolute micron rating of 5 microns wherein the air filter element comprises a high capacity pleated filter;
   a first seal sealingly engaged to the filter cover and to the air filter element;
   a second seal sealingly engaged to the filter cover and to the air filter element; and
   a third seal sealingly engaged to the air filter element and a housing near an inlet flow path.

2. The air filter assembly of claim 1, wherein the air filter assembly has a length between 2.025 inches and 2.045 inches.

3. The air filter assembly of claim 1, wherein the air filter element has a length between 1.480 inches and 1.500 inches.

4. The air filter assembly of claim 1, wherein the air filter assembly has a diameter between 1.495 inches and 1.505 inches.

5. The air filter assembly of claim 1, wherein the air filter element is made of a material selected from the group consisting of nickel, cobalt or an alloy thereof.

6. The air filter assembly of claim 1, wherein the first, second and third seals are made of a material selected from the group consisting of nickel, cobalt or an alloy thereof.

7. The air filter assembly of claim 1, further comprising at least one circular drill path extending from a bleed air source to the air filter element.

8. The air filter assembly of claim 1, further comprising a first circular drill path extending from the air filter element to a first outlet.

9. The air filter assembly of claim 8, further comprising a second circular drill path extending from the air filter element to a second outlet.

10. A method of filtering incoming bleed air comprising:
   receiving bleed air from an engine;
   routing the bleed air through an inlet path;
   filtering the bleed air through an air filter arrangement comprising:
      a filter cover;
      an air filter element with a diameter ranging between 1.400 and 1.420 inches, the air filter element having an absolute micron rating of 5 microns, wherein the air filter element comprises a high capacity pleated filter;
      a first seal sealingly engaged to the filter cover and to the air filter element;
      a second seal sealingly engaged to the filter cover and to the air filter element; and
      a third seal sealingly engaged to the air filter element and a housing near the inlet flow path; and
   delivering the bleed air through an outlet path.

11. The method of claim 10, further comprising passing the bleed air through a separator with a rating of 40 microns prior to routing the bleed air through an inlet path.

12. The method of claim 10, wherein the air filter element is sealed such that there is negligible leakage of bleed air out of the air filter element.

13. An air filter arrangement comprising:
   a filter cover;
   an air filter element with a diameter ranging between 1.400 and 1.420 inches, the air filter element having an absolute micron rating of 5 microns wherein the air filter element comprises a high capacity pleated filter;
   a first seal sealingly engaged to the filter cover and to the air filter element;
   a second seal sealingly engaged to the filter cover and to the air filter element; and
   a third seal sealingly engaged to the air filter element and a housing near an inlet flow path;
   wherein the first seal has a larger diameter than the second seal and the first seal is configured to prevent external leakage of fluid or contaminants going through the air filter element and the second seal is configured to prevent bypass of contaminants around the air filter element.

14. The air filter arrangement of claim 13, wherein the air filter element is made of a material selected from the group consisting of nickel, cobalt or an alloy thereof and the first, second and third seals are made of a material selected from the group consisting of nickel, cobalt or an alloy thereof.

* * * * *